(12) United States Patent
Dasher

(10) Patent No.: US 12,311,267 B2
(45) Date of Patent: May 27, 2025

(54) SYSTEMS AND METHODS FOR PERFORMING AN ACTION IN RESPONSE TO A CHANGE IN STATUS OF AN INPUT DEVICE

(71) Applicant: Adeia Guides Inc., San Jose, CA (US)

(72) Inventor: Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 327 days.

(21) Appl. No.: 17/941,236

(22) Filed: Sep. 9, 2022

(65) Prior Publication Data

US 2024/0082733 A1    Mar. 14, 2024

(51) Int. Cl.
| | |
|---|---|
| *A63F 13/79* | (2014.01) |
| *A63F 13/49* | (2014.01) |
| *A63F 13/533* | (2014.01) |
| *A63F 13/61* | (2014.01) |
| *G06Q 30/0251* | (2023.01) |
| *A63F 13/211* | (2014.01) |

(52) U.S. Cl.
CPC .............. *A63F 13/61* (2014.09); *A63F 13/49* (2014.09); *A63F 13/533* (2014.09); *A63F 13/79* (2014.09); *G06Q 30/0262* (2013.01); *G06Q 30/0269* (2013.01); *A63F 13/211* (2014.09); *A63F 2300/105* (2013.01); *A63F 2300/308* (2013.01); *A63F 2300/5506* (2013.01); *A63F 2300/5546* (2013.01)

(58) Field of Classification Search
CPC ........ A63F 13/61; A63F 13/49; A63F 13/533; A63F 13/79; A63F 13/211; A63F 2300/105; A63F 2300/308; A63F 2300/5506; A63F 2300/5546
See application file for complete search history.

(56) References Cited

U.S. PATENT DOCUMENTS

| | | | |
|---|---|---|---|
| 6,798,426 B1 * | 9/2004 | Tateishi | A63F 13/822 715/706 |
| 2004/0015608 A1 * | 1/2004 | Ellis | A63F 13/12 709/246 |
| 2016/0127775 A1 * | 5/2016 | Zilberstein | H04N 21/458 725/34 |
| 2019/0005542 A1 * | 1/2019 | Goldshtein | G06Q 30/0256 |
| 2019/0273954 A1 * | 9/2019 | Evans | H04N 21/25883 |
| 2020/0346114 A1 * | 11/2020 | Verma | A63F 13/53 |

* cited by examiner

*Primary Examiner* — Omkar A Deodhar
*Assistant Examiner* — Shauna-Kay Hall
(74) *Attorney, Agent, or Firm* — Haley Guiliano LLP

(57) ABSTRACT

Systems and methods are provided for performing an action in response to a change in status of an input device. A media item is generated for output at a computing device, and a change in status of an input device associated with the computing device is identified. An indication of the change in status of the input device is received, and, in response to receiving the indication, an action is performed based on the media item.

20 Claims, 9 Drawing Sheets

SYSTEMS AND METHODS FOR PERFORMING AN ACTION IN RESPONSE TO A CHANGE IN STATUS OF AN INPUT DEVICE

BACKGROUND

The present disclosure is directed towards systems and methods for performing an action in response to a change in status of an input device. In particular, systems and methods are provided herein for enabling an action to be performed in response to a change in status of an input device based on an identified threshold.

SUMMARY

The proliferation of computing devices, such as next-generation gaming consoles and smart televisions has led to a rise in available computing power and hence increased the range of actions and tasks that these devices can perform. However, not all computing devices make efficient use of idle time and/or resources when a user is absent and/or present. For example, a gaming console may only run updates at night, rather than during downtime between gaming sessions. In another example, a smart television may display advertisements when there are no users in the room. Part of the problem is that many computing devices are unable determine whether a user is engaging with the output of a computing device (e.g., watching a content item), or whether a user is about to stop engaging with the output of the computing device (e.g., about to leave a room). Further, many computing devices are unable to determine whether a user is about to perform an action (e.g., fast-forward through an advertisement). As a computing device has incomplete information about how a user is engaging, or is about to engage, with the output of the computing device, typically, it is difficult for a computing device to address these problems.

To overcome these problems, systems and methods are provided herein for performing an action in response to change in status of an input device.

Systems and methods are described herein for enabling an action to be performed in response to a change in status of an input device. A media item is generated for output at a computing device, and a threshold is identified. The threshold is based on a status of an input device over a period of time, and the input device is associated with the computing device. A change in status of the input device that is greater than the threshold is identified, and an indication of the change in status of the input device is received. In response to receiving the indication, an action based on the media item is performed.

In an example system, a user switches on a gaming console and loads a video game. The video game is generated for output at the gaming console and is displayed via a display connected to the gaming console. A user engages with the gaming console via a wireless controller. When a user is using the gaming console, the controller moves around. The movement may vary depending on the action on the screen, but as long as the controller is being held by the user, the controller will move to a varying degree. Over a period of time, a threshold may be identified based on the movement of the controller. The threshold may pertain to controller position changes, controller orientation changes, controller distance travelled, time periods of controller motion or lack thereof, or rate of movement for the controller overt time. Regardless of the exact nature or value of the threshold, the threshold may be utilized by the system to determine that the controller has changed states. In some instances, the states or statuses of the controller represent the state of movement (or lack thereof) of the controller. It may be said that the states indicate whether the controller is in use. For example, when a user puts down the controller to eat a snack, the controller may be considered static. A static state suggests the console or system corresponding to the controller is not in use. In this example, the change in the status of the controller from moving to static may be determined to be greater than the threshold, and an indication of the change in status of the controller or input device is received. In some examples, this may comprise receiving an indication from the controller itself. In other examples, this may comprise one component (for example, a hardware and/or software component) of the gaming console or system receiving an indication from another component of the gaming console (e.g., infrared, lidar, or image sensors of the console). In response to receiving the indication of the change in status, an action is performed based on the media item. For example, the video game may be paused, and an advertisement may be generated for output at the gaming console.

The media item may be a video game and performing the action may further comprise pausing the video game and generating an advertisement for output. Generating an advertisement for output may further comprise altering an element of the video game based on the advertisement. The change in status of the input device may be a first change in status, and performing the action may further comprise identifying a second change in status of the input device and generating a content item for output based on the video game gameplay between the first change in status and the second change in status. Performing the action may further comprise identifying a second change in status of the input device and changing a status of a character of the video game between the first change in status and the second change in status.

Identifying a change in status of the input device may further comprise identifying a movement of the input device, or may further comprise identifying an absence of movement of the input device over a threshold period of time.

Performing the action may further comprise generating a summary of a plurality of advertisements and generating the summary of the plurality of advertisements for output. Performing the action may further comprise identifying that an advertisement is being generated for output and generating a user interface element for output, the user interface element configured to enable input on the advertisement to be received. A user profile may be associated with the computing device, and performing the action may further comprise generating an advertisement for output based on the user profile. A time period for performing the action may be identified based on the change in status.

In some instances, the input device is a remote control and the corresponding system receiving input via the input device is a media platform or system that delivers video (e.g., an over-the-top or OTT box; a set-top box that provides cable service, for example; or a television, such as a smart-tv including an operating system configured to enable video delivery and display).

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 8:
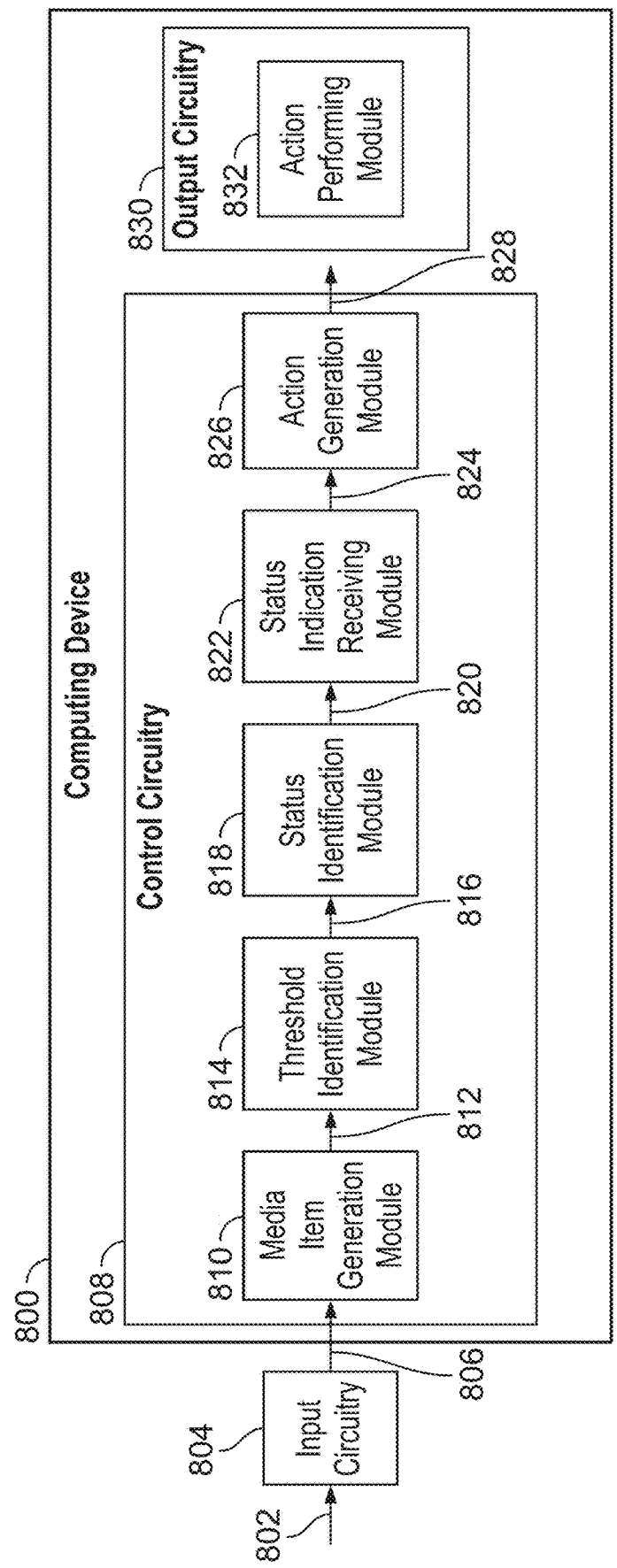
Figure 9:
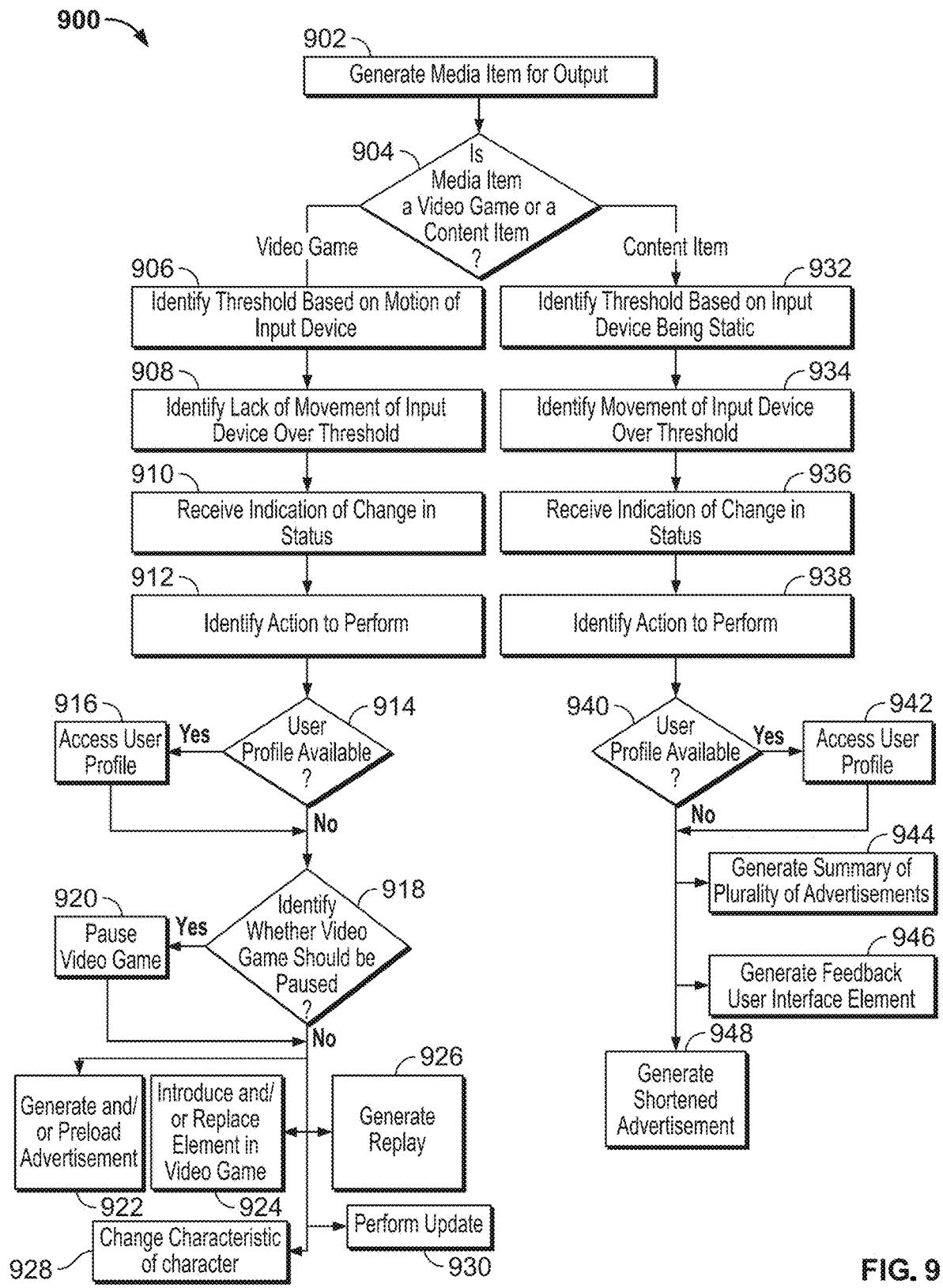

FIG. 8 shows a block diagram representing components of a computing device and dataflow therebetween for enabling an action to be performed in response to change in status of an input device, in accordance with some embodiments of the disclosure; and FIG. 9 shows a flowchart of illustrative steps involved in enabling an action to be performed in response to change in status of an input device, in accordance with some embodiments of the disclosure.

DETAILED DESCRIPTION

Systems and methods are described herein for enabling an action to be performed in response to a change in status of an input device. A media item includes audio, video, text, a video game and/or any other media content. A content item is a type of media item that typically comprises audiovisual components. A media item may be a single media item. In other examples, it may be a series (or season) of episodes of media content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or video-on-demand (VOD) service (or platform) may be accessed via a website and/or an app running on a computing device, and the device may receive any type of content item, including live content items and/or on-demand content items. Media items may, for example, be streamed to physical computing devices. In another example, media items may, for example, be streamed to virtual computing devices in, for example, an augmented environment, a virtual environment and/or the metaverse.

An input device includes any wired and/or wireless controller for a computing device. For example, this may include a wireless controller for a gaming console and/or a remote control for a television. An input device may comprise an inertial measurement unit (IMU) or any other means for detecting motion of the input device. The input device may comprise an infrared component, a Bluetooth component, a Wi-Fi component and/or a touchscreen. The input device may be a keyboard, a mouse and/or a microphone.

The identification of a threshold and/or a change in status of an input device may take place at the input device itself, based on data transmitted to a local computing device associated with the input device and/or at a server remote from the input device and/or local computing device. In some examples, input devices may have pre-generated profiles associated with them that are stored in a server. On identifying an input device, a local computing device may request the profile from a server and may base the threshold and/or change in status on the profile. In some examples, these pre-generated profiles may be provided by a manufacturer of the input device. In another example, data may be collected from a plurality of the same, or similar, input devices, and the threshold and/or change in status may be identified at a server for the plurality of input devices. In other examples, an input device may comprise two components that are physically separate but are in communication with one another. In some examples, identifying the threshold and/or change in status may be based on one, or both, of the two components.

The disclosed methods and systems may be implemented on one or more computing devices. As referred to herein, the computing device can be any device comprising a processor and memory, for example, a television, a smart television, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
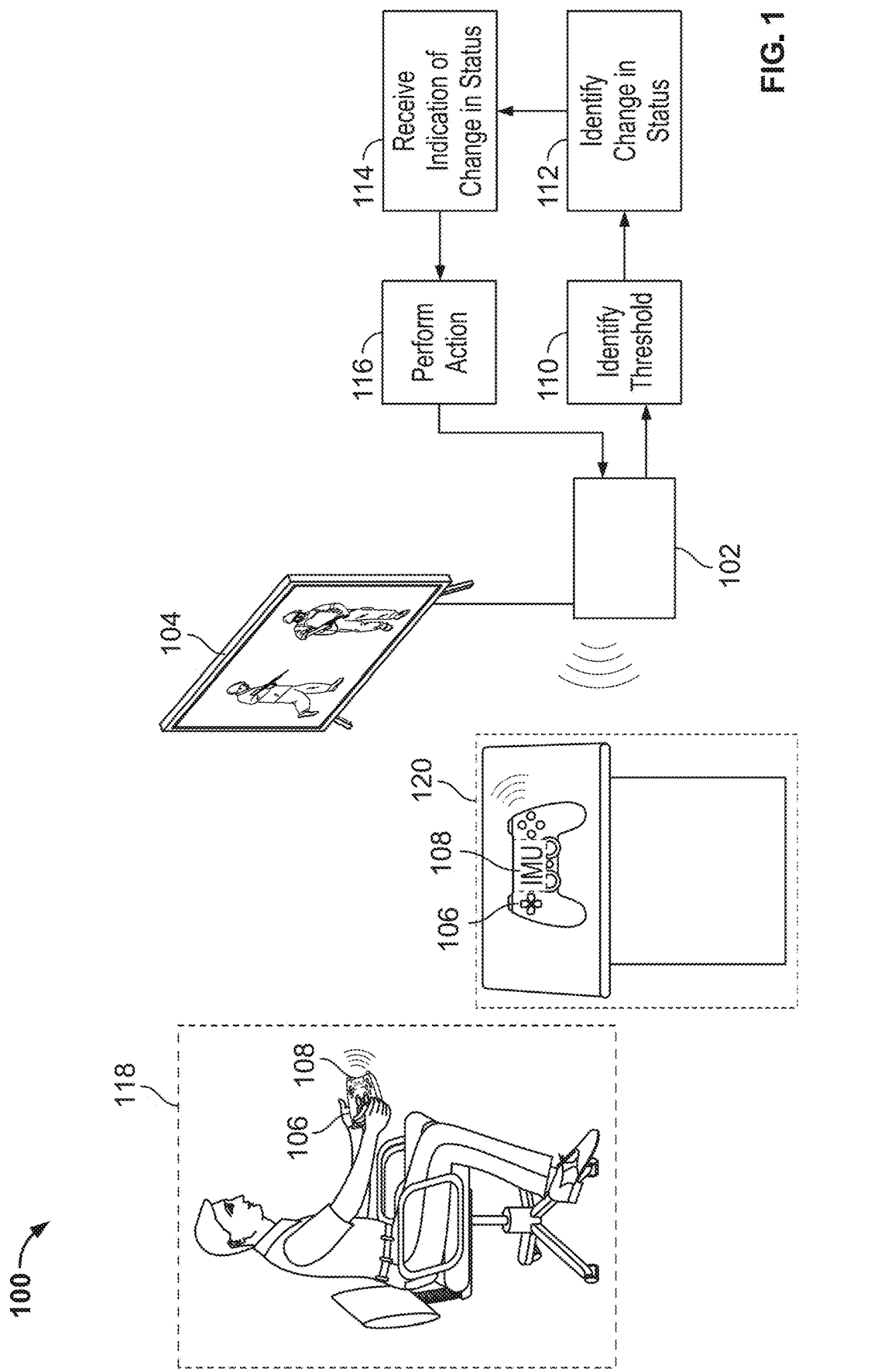
FIG. 1 shows an example environment in which an action is performed in response to a change in status of an input device, in accordance with some embodiments of the disclosure.

FIG. 1 shows an example environment in which an action is performed in response to a change in status of an input device, in accordance with some embodiments of the disclosure. The environment 100 comprises a computing device, in this example, gaming console 102, a display 104, and a controller 106 that, in this example, comprises an IMU 108. FIG. 1 depicts a first scenario 118 in which the controller 106 is in a state of use and a second scenario 120 in which the controller 106 is in a state of disuse. The gaming console 102 generates a gaming output that is displayed via display 104. In some examples, the gaming console 102 is connected to a network, such as the internet. Media items, including games streamed via the cloud and content items such as films and/or television shows may be received via the internet. A user interacts with the gaming console 102 via controller 106. In this example, the controller 106 is a wireless controller that is connected to the gaming console via, for example, a Bluetooth connection; however, in other examples, the controller may be connected to the gaming console via wired means. A threshold is identified 110 based on the status of the controller 106 over a period of time. In the first scenario 118, as the user is interacting with the controller 106 as they play a game on the gaming console 102, a threshold based on the movement of the controller 106 is identified. In some examples, the threshold may be based on an average movement of the controller 106 over a period of time. In some examples, the period of time may be five seconds, 30 seconds and/or a minute. In another example, the threshold may be based on a number of measurements of movement in a particular direction in three-dimensional space. In some instances, the system may indicate threshold indicating a minimum distance the controller 106 must move to change states or status (e.g., from "active" or "moving" to "static" or vice versa). By exceeding the threshold, the movement of the controller 106 may indicate that the controller 106 is being picked up or put down, for example. In some instances, the threshold may indicate a minimum period of time that the controller 106 must be relatively still or relatively in-movement before a status or state change is recognized. In such an embodiment, the system utilizes multiple thresholds. For example, the system may utilize (i) a first threshold relating to distance or movement of the controller may be utilized to determine whether or not the controller is considered to be moving or not and (ii) a threshold relating to time, indicating for how long the distance or movement must be detected before a state or status transition can be determined. In an embodiment, movement of the controller 106 might only be considered movement when a sufficient location change is detected (e.g., a change of location of 2 inches or more might be needed) or when a sufficient orientation change is detected (e.g., the controller might need a 15 degree change in orientation before the controller 106 is considered to be moving). Orientation or position of the controller 106 may be detected via any suitable sensor(s) of the controller 106 or the corresponding system 102. For example, the controller 106 may include an IMU or GPS system to detected controller motion. The system 102 may include IR sensors, laser sensors, or image sensors that might be utilized to track movement of the controller 106. In some embodiments, the threshold indicates a number of detected movements for the controller 106 for a given time period. In an embodiment, the controller 106 is a controller for a media platform or system that delivers video (e.g., an over-the-top or OTT box; a set-top box that provides cable service, for example; or a television, such as a smart-tv including an operating system configured to enable video delivery and display).

In any event, the threshold may be used to determine that a change in state or status of the controller 106 has occurred. For example, when the user puts down the controller 106 in the second scenario 120, a change in status, based on the threshold, is identified 112. In this example, the system is looking to identify that the controller 106 has changed from a state where it is substantially moving (i.e., being used for gaming) to a state where it is substantially stationary (i.e., it has been put down). The change in status may be identified at the controller 106 itself. In another example, data may be transmitted from the controller 106 to the gaming console 102 and the change in status may be identified at the gaming console 102. The movement of the controller for either, or both, of the identifying 110, 112 steps may be identified via IMU 108. In other examples, the controller 106 may comprise any sensor suitable for detecting a change in movement. In another example, the wireless signal between the controller 106 and the gaming console 102 may be monitored to identify, for example, changes in strength of the signal. In some examples, a change in signal strength may be determined via a received signal strength indicator (RSSI) that may fluctuate based on movement of the controller 106. In some examples, a trained machine learning algorithm may be used to associate various controller 106 movements with a threshold and/or a change in status of the controller 106. The trained machine learning algorithm may reside on the gaming console 102 and/or at a server remote from the gaming console 102.

On identifying the change in status, an indication of the change in status is received 114. In some examples, this may comprise receiving an indication from the controller itself. In other examples, this may comprise one component (for example, a hardware and/or software component) of the gaming console 102 receiving an indication from another component of the gaming console 102. On receiving an indication of the change in status, an action 116 to perform is determined and subsequently performed. The action to perform may be determined at the gaming console 102. In another example, data may be transmitted to a server via a network, such as the internet, and the action 116 to perform may be determined at the server. On determining the action 116 to perform, the server may transmit the action to the gaming console 102, where the action is performed. The action 116 may comprise a single action. In another example, the action 116 may comprise a plurality of actions that may be performed sequentially and/or in parallel.

Figure 2:
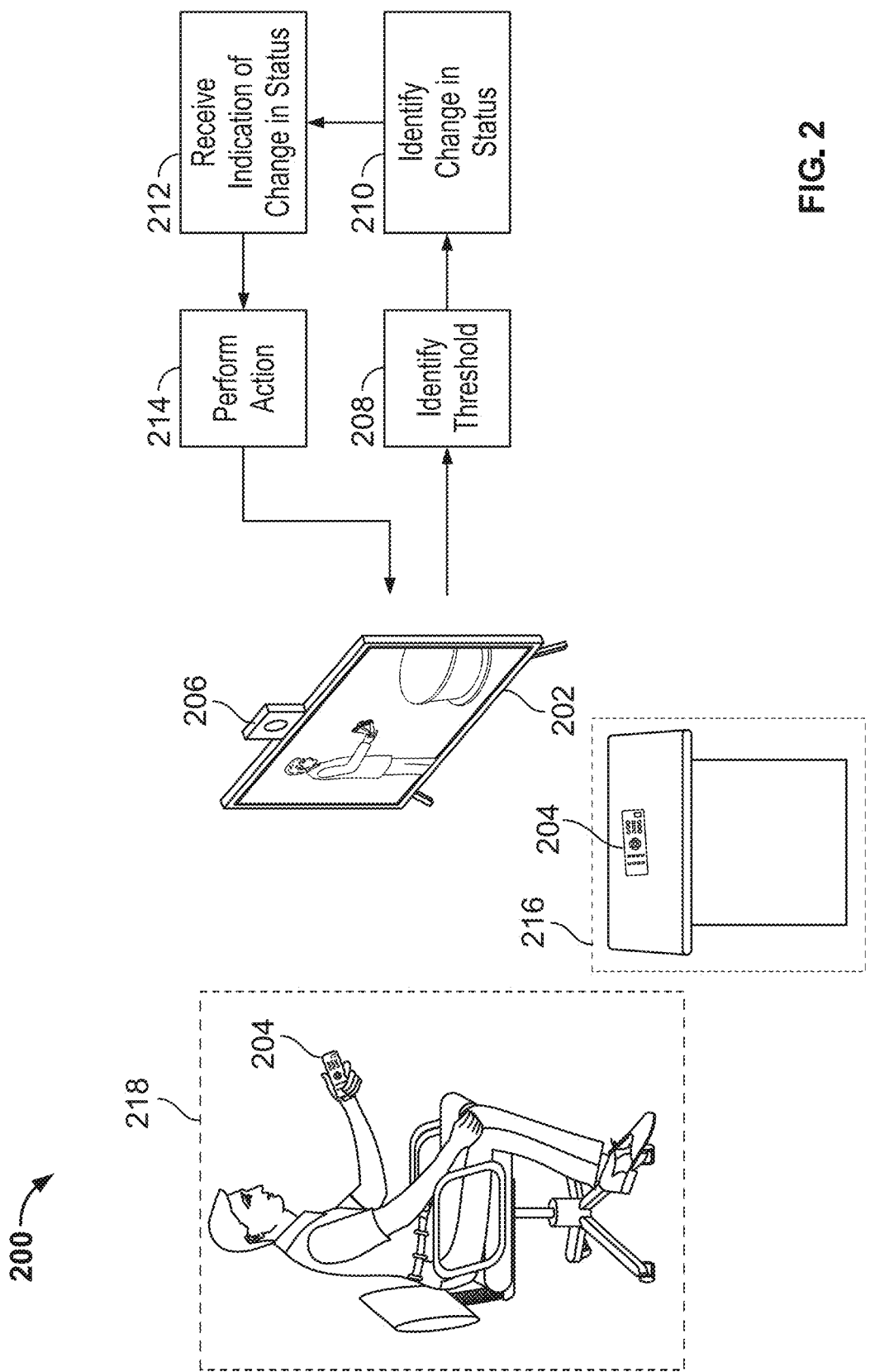
FIG. 2 shows another example environment in which an action is performed in response to a change in status of an input device, in accordance with some embodiments of the disclosure.

FIG. 2 shows another example environment in which an action is performed in response to a change in status of an input device, in accordance with some embodiments of the disclosure. The environment 200 comprises a computing device, in this example, smart television 202, a remote control 204 and a camera 206 in communication with the smart television 202. FIG. 2 depicts a first scenario 216 in which the remote control 204 is in a state of disuse and a second scenario 218 in which the remote control 204 is in a state of use. The smart television 202 generates a content item output that is displayed via a display of the smart television 202. In some examples, the smart television 202 is connected to a network, such as the internet. Media items, including content items such as films and/or television shows, may be received via the internet. A user interacts with the smart television 202 via remote control 204. In this example, the remote control 204 is a wireless controller that communicates with the smart television 202 via infrared. Movement or orientation of the remote control 204 may be tracked in a manner similar to that described with reference to the controller 106 depicted in FIG. 1. Additionally, one or more thresholds similar or identical to those described with reference to FIG. 1 may be utilized to determine whether or not a change in status of the remote control 204 has occurred.

A threshold is identified 208 based on the status of the controller 204 over a period of time. In the first scenario 216, as the user is watching a content item on the smart television 202, a threshold based on the movement of the remote control 204 is identified. In some examples, the threshold may be based on an average movement of the remote control 204 over a period of time. In some examples, the period of time may be five seconds, 30 seconds and/or a minute. The movement may be measured using any suitable speed measurement (e.g., mph), distance measurement (e.g., inches or cm), acceleration measurement (e.g., meter per second squared), position measurement (e.g., a coordinate position), or orientation measurement (e.g., measured in degrees relative to any suitable plane). In an example, the threshold may require a minimum of either 15 degrees rotation observed over five seconds or four inches travelled over 10 seconds. In some instances, the threshold may be represented by one or more logical OR statements. For example, the operating threshold may be exceeded when any of the following is true: (Threshold1 exceeded) OR (Threshold2 exceeded) OR (Threshold3 exceeded). In another example, the threshold may be based on a number of measurements of movement in a particular direction in three-dimensional space. When the user picks up the remote control 204 in the second scenario 218, a change in status, based on the threshold, is identified 210. In this example, the system is looking to identify that the remote control 204 has changed from a state where it is substantially stationary (i.e., not being used while the content item is being watched) to a state where it is moving (i.e., it has been picked up). In addition to the ways of identifying a change in status of a controller described in connection with FIG. 1, the camera 206 may be used to monitor the movement of the controller. A capture from the camera 206 may be analyzed by a trained machine learning algorithm to determine whether the controller is moving or is stationary. In some examples, this analysis may take place at the smart television 202. In other examples, an output from the camera 206 may be streamed to a server remote from the smart television 202 via a network, such as the internet, and a trained machine learning algorithm may be run at the server. An example of how a trained machine learning algorithm may be utilized to identify a threshold and/or a change in status of a controller, such as remote control 204, is described in connection with FIG. 7 below.

On identifying the change in status, an indication of the change in status is received 212. In some examples, this may comprise receiving an indication from the controller itself. In other examples, this may comprise one component (for example, a hardware and/or software component) of the smart television 202 receiving an indication from another component of the smart television 202. On receiving an indication of the change in status, an action 214 to perform is determined and subsequently performed. The action to perform may be determined at the smart television 202. In another example, data may be transmitted to a server via a network, such as the internet, and the action 214 to perform may be determined at the server. On determining the action 214 to perform, the server may transmit the action to the smart television 202, where the action is performed. The action 214 may comprise a single action. In another example, the action 214 may comprise a plurality of actions that may be performed sequentially and/or in parallel.

Figure 3:
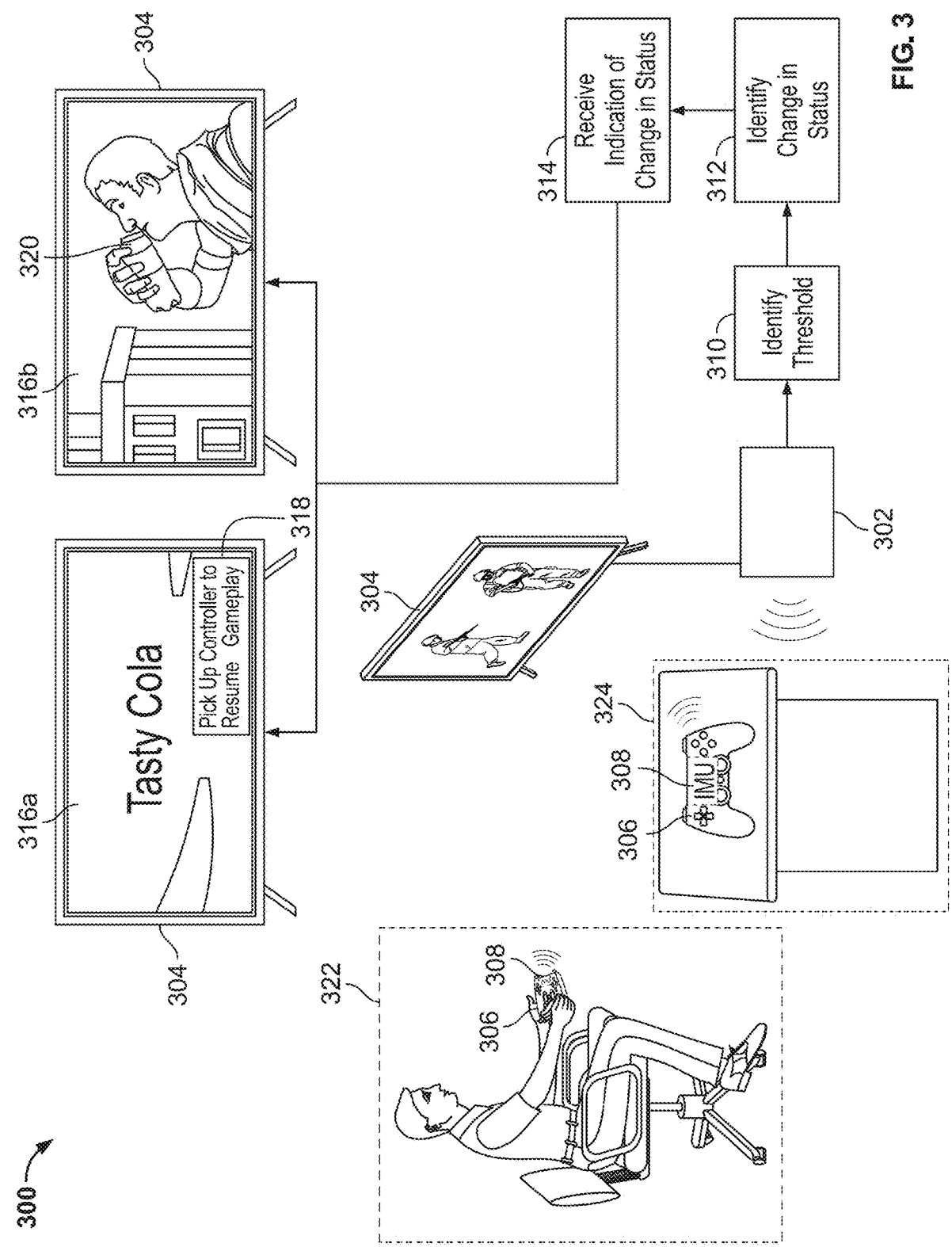
FIG. 3 shows another example environment in which an action is performed in response to a change in status of an input device, in accordance with some embodiments of the disclosure.

FIG. 3 shows another example environment in which an action is performed in response to a change in status of an input device, in accordance with some embodiments of the disclosure. In a similar manner to the environment 100 discussed in connection with FIG. 1, the environment 300 comprises a gaming console 302, a display 304, and a controller 306 that, in this example, comprises an IMU 308. FIG. 3 depicts a first scenario 322 in which the controller 306 is in a state of use and a second scenario 324 in which the controller 306 is in a state of disuse. The gaming console 302 generates a gaming output that is displayed via display 304. A user interacts with the gaming console 302 via controller 306. In this example, the controller 306 is a wireless controller that is connected to the gaming console via, for example, a Bluetooth connection; however, in other examples, the controller may be connected to the gaming console via wired means. Movement or orientation of the controller 306 may be tracked in a manner similar to that described with reference to the controller 106 depicted in FIG. 1. Additionally, one or more thresholds similar or identical to those described with reference to FIG. 1 may be utilized to determine whether or not a change in status of the controller 306 has occurred.

A threshold is identified 310 based on the status of the controller 306 over a period of time. When the user puts down the controller 306 in the second scenario 324, a change in status, based on the threshold, is identified 312. On identifying the change in status, an indication of the change in status is received 314. On receiving an indication of the change in status, an action to perform is determined and subsequently performed. In this example, two actions 316a, 316b to perform are depicted; however, it is contemplated that, in some examples, only one of the actions 316a, 316b is performed at the gaming console 302. The first action 316a is to generate a full screen advertisement 316a for display. In some examples, a media item running on the gaming console 302 is automatically paused before the full screen advertisement is displayed. In some examples, the full screen advertisement 316 may comprise a service message 318, such as a message indicating that the controller 306 should be picked up to resume the media item. In another example, the service message may comprise statistics and/or data corresponding to the gaming session, for example, number of players left in a multiplayer game and/or the player who is currently winning. The advertisement may be based on the media item in that an advertiser may have indicated that the advertisement can be displayed when that media item is paused. The second action 316b is to alter an element of the media item for display. In some examples, a media item running on the gaming console 302 is automatically paused before an element of the media item is altered. In this example, a character of a video game is altered to drink a beverage 320 that is being advertised. Any element of the video game can be altered including, for example, a character's image and/or equipment. In some examples, the character may be altered to include equipment that has not currently been purchased but is available for purchase. In one example, the character might be altered to include a hat, and a corresponding message may be displayed, for example "This hat is now on sale in the store." In some examples, a vehicle associated with the character may be altered to display an advertisement and/or a logo for a product. In another example, a character's clothing may be altered to reflect the colors of an item being advertised. In some examples, a character's attributes may be altered based on the time a video game is paused. In some examples, the gaming console may alternate between first action 316a and second action 316b. For example, the full screen advertisement may be generated for display for, for example, 30 seconds, and the character of the video game drinking the beverage 320 may be generated for display for the following 30 seconds. In some examples, the character drinking the beverage 320 may be static. In other examples, the character drinking the beverage 320 may drink the beverage 320 in, for example, a loop. Either, or both, of the first and second actions 316a, 316b may have one or more audio components associated with it.

Figure 4:
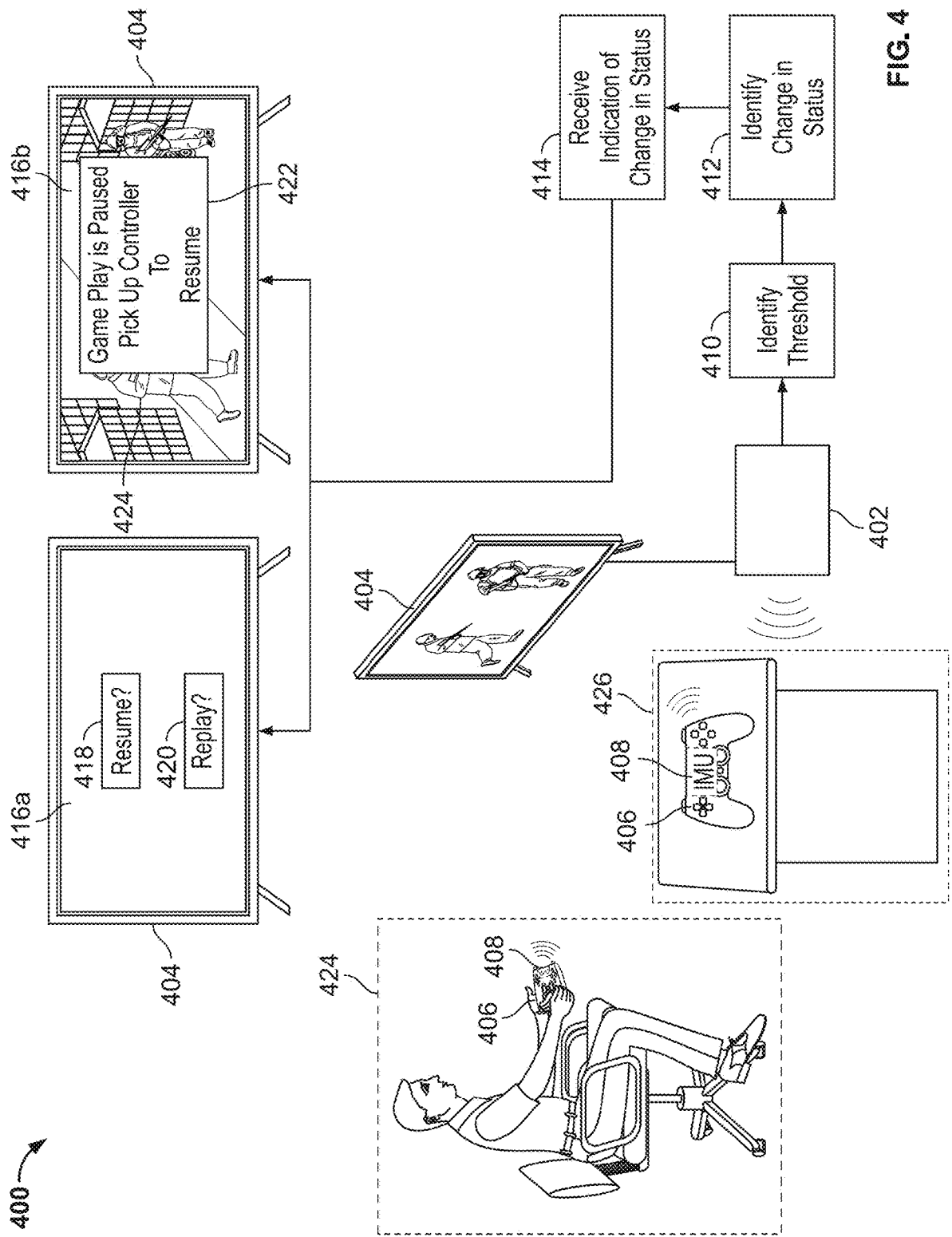
FIG. 4 shows another example environment in which an action is performed in response to a change in status of an input device, in accordance with some embodiments of the disclosure.

FIG. 4 shows another example environment in which an action is performed in response to a change in status of an input device, in accordance with some embodiments of the disclosure. In a similar manner to the environment 100, 300 discussed in connection with FIGS. 1 and 3, the environment 400 comprises a gaming console 402, a display 404, and a controller 406 that, in this example, comprises an IMU 408. FIG. 4 depicts a first scenario 424 in which the controller 406 is in a state of use and a second scenario 426 in which the controller 406 is in a state of disuse. The gaming console 402 generates a gaming output that is displayed via display 404. A user interacts with the gaming console 402 via controller 406. In this example, the controller 406 is a wireless controller that is connected to the gaming console via, for example, a Bluetooth connection; however, in other examples, the controller may be connected to the gaming console via wired means. Movement or orientation of the controller 406 may be tracked in a manner similar to that described with reference to the controller 106 depicted in FIG. 1. Additionally, one or more thresholds similar or identical to those described with reference to FIG. 1 may be utilized to determine whether or not a change in status of the controller 406 has occurred.

A threshold is identified 410 based on the status of the controller 406 over a period of time. When the user puts down the controller 406 in the second scenario 426, a change in status, based on the threshold, is identified 412. On identifying the change in status, an indication of the change in status is received 414. On receiving an indication of the change in status, an action to perform is determined and subsequently performed. In this example, two actions 416a, 416b to perform are depicted; however, it is contemplated that, in some examples, only one of the actions 416a, 416b is performed at the gaming console 402. The first action 416a comprises pausing a video game running on gaming console 402 and generating a resume screen at display 404. The resume screen enables a user to select a first user interface element 418 that allows a user to resume playing the game, in a typical manner. The resume screen also enables a user to select a second user interface element 420 that allows a user to watch a replay of any action that they have missed while the game has been paused. For example, if the media item is a multiplayer video game, although the game is paused for the present user, the game may continue in the background for the other players. On selecting the replay user interface element 420, a short replay may be generated and displayed at the display 404, before the game is resumed. In some examples, the replay may be a sped-up reproduction of the view of one of the other players of the game. For example, if the game was paused for one minute, the replay may be a 2× replay, so that it fits into 30 seconds. In another example, key plays may be identified, and the replay may comprise a rendering of the key plays. The replay may be generated at the gaming console 402 and/or may be transmitted to the gaming console 402 from a remote server via a network, such as the internet. In another example, the replay may be generated from frames stored in a buffer of the gaming console 402. The replay may comprise a timer to indicate when live gameplay will resume. The second action 416b is to pause a video game and to change a status of a character 424 of the video game (e.g., the user's character). Changing the status of the character 424 may comprise making the character invisible, and/or invincible, while the video game is paused and/or for a period after the video game resumes. In addition, a service message 422 may be generated for display, for example indicating that the controller 406 should be picked up to resume the game. In some examples, actions 416a and 416b may be combined, such that the status of the character 424 is changed and a replay is generated. Either, or both, of the first and second actions 416a, 416b may have one or more audio components associated with it.

Any of the actions 316a, 316b, 416a, 416b may be combined in any suitable manner. In addition, other actions may be generated and performed at the gaming console 302, 402. Other actions include, but are not limited to, preloading any advertisements and/or elements of a media item, and performing a software update associated with the gaming console 402 and/or the media item (e.g., updating software and/or components associated with a video game). In some examples, the action, or actions, may be performed at the controller and/or a secondary computing device associated with the gaming console 302, 402. For example, the controller 306, 406 and/or the secondary computing device, such as a smartwatch, may comprise a display at which an advertisement is displayed. In this example, the advertisement may be transmitted from the gaming console 302, 402 via a local wireless means. In other examples, the advertisement may be received from a server via a network, such as the internet, in response to a communication sent from the gaming console 302, 402 to the server via the network. In another example, the secondary computing device may be a smart speaker, and the action may comprise playing audio at the smart speaker, for example an advertising audio and/or a voice message indicating a status of the gaming console 302, 402, such as "gaming console switched on." In some examples, a user can provide an audio input to the smart speaker to perform an additional action, such as turning off the gaming console 302, 402. In some examples, a time period in which the action is to be performed is identified based on the identified change in status. For example, the change in status may indicate that a person is to imminently leave a room in which the gaming console 302, 402 is located, and therefore the action should be performed in a relatively short time period.

Figure 5:
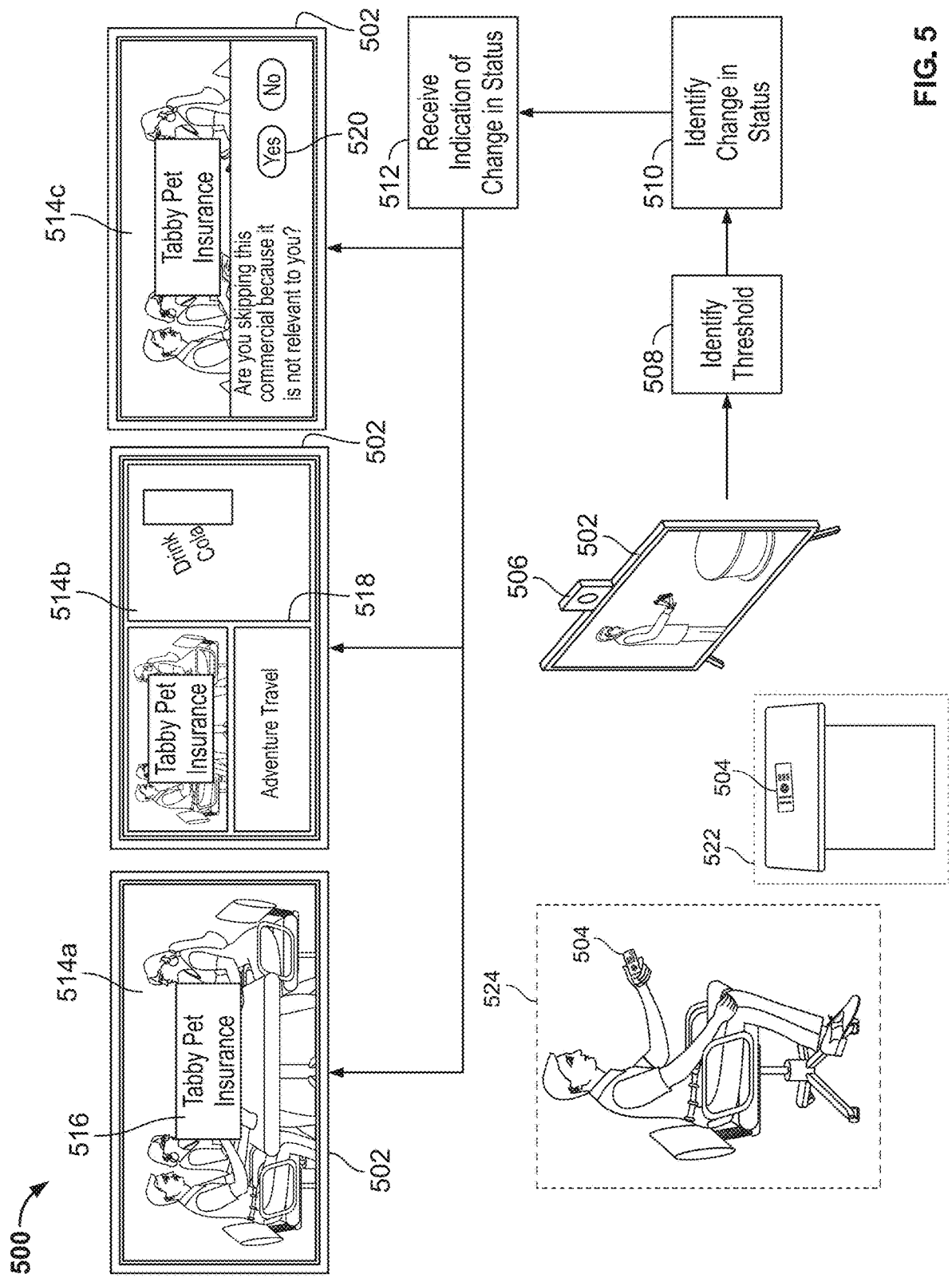
FIG. 5 shows another example environment in which an action is performed in response to a change in status of an input device, in accordance with some embodiments of the disclosure.

FIG. 5 shows another example environment in which an action is performed in response to a change in status of an input device, in accordance with some embodiments of the disclosure. In a similar manner to the environment 200 discussed in connection with FIG. 2, the environment 500 comprises a smart television 502, a remote control 504 and a camera 506 in communication with the smart television 502. FIG. 5 depicts a first scenario 522 in which the remote control 504 is in a state of disuse and a second scenario 524 in which the remote control 504 is in a state of use. The smart television 502 generates a content item output that is displayed via a display of the smart television 502. A user interacts with the smart television 502 via remote control 504. In this example, the remote control 504 is a wireless controller that communicates with the smart television 502 via infrared. Movement or orientation of the remote control 504 may be tracked in a manner similar to that described with reference to the controller 106 depicted in FIG. 1. Additionally, one or more thresholds similar or identical to those described with reference to FIG. 1 may be utilized to determine whether or not a change in status of the remote control 504 has occurred.

A threshold is identified 508 based on the status of the controller 504 over a period of time. When the user picks up the controller 504 in the second scenario 524, a change in status, based on the threshold, is identified 510. On identifying the change in status, an indication of the change in status is received 512. On receiving an indication of the change in status, an action to perform is determined and subsequently performed. In this example, three actions 514a, 514b, 514c to perform are depicted; however, it is contemplated that, in some examples, only one, or two, of the actions 514a, 514b, 514c is performed at the smart television 502. The first action 514a comprises generating and displaying a summary, shortened, or "last gasp" advertisement at the smart television 502. Instead of displaying an entire advertisement, a shortened advertisement is generated for display. For example, if an original advertisement is 25 seconds long, the advertisement may be replaced with a logo and/or message 516 and a jingle for a product that is being advertised. The second action 514b comprises generating and displaying a summary 518 of a plurality of advertisements. Instead of displaying the plurality of advertisements, a summary 518 of the advertisements is generated for display. For example, if six advertisements are scheduled to be displayed during a commercial break, then a summary 518, for example, a static image, of the six advertisements is generated for output. If a change in status of the remote control 504 indicates that it has been picked up, this may indicate that a user is about to change a channel and/or fast-forward through an advertisement. By displaying a summary of the advertisement, or advertisements, the advertisement, or advertisements, may still have an impact on the user, before any channel change or fast-forwarding takes place. In some examples, the summary of the advertisement, or advertisements, may be generated at the smart television 502. In other examples, the summary of the advertisement, or advertisements, may be generated at a server, remote from the smart television 502, and may be transmitted to the smart television 502 via a network, such as the internet. The third action 514c comprises generating a user interface element 520 for receiving feedback. For example, a status box with the text "Is this commercial relevant to you" may be displayed along with user interface elements for "Yes" and "No." In some examples, the user interface element may be generated at the smart television 502. In other examples, the user interface element may be generated at a server, remote from the smart television 502, and may be transmitted to the smart television 502 via a network, such as the internet. The advertisements may be based on the media item in that an advertiser may have indicated that the advertisement can be displayed in a commercial break associated with the media item. Any of the first, second and third actions 514a, 514b, 514c may have one or more audio components associated with it.

Any of the actions 514a, 514b, 514c may be combined in any suitable manner. In addition, other actions may be generated and performed at the smart television 502. Other actions include, but are not limited to, preloading any advertisements and/or elements of a media item, and performing a software update associated with the smart television 502 (e.g., updating software and/or components associated with a video game). In some examples, the action, or actions, may be performed at the controller and/or a secondary computing device associated with the smart television 502. For example, the remote control 504 and/or the secondary computing device, such as a smartwatch, may comprise a display at which an advertisement is displayed. In this example, the advertisement may be transmitted from the smart television 502 via a local wireless means. In other examples, the advertisement may be received from a server via a network, such as the internet, in response to a communication sent from the smart television 502 to the server via the network. In another example, the secondary computing device may be a smart speaker and the action may comprise playing audio at the smart speaker, for example an advertising audio and/or a voice message indicating a status of the smart television 502, such as "TV switched on." In some examples, a user can provide an audio input to the smart speaker to perform an additional action, such as turning off the smart television. In some examples, a time period in which the action is to be performed is identified based on the identified change in status. For example, the change in status may indicate that a person is to imminently leave a room in which the smart television 502 is located, and therefore the action should be performed in a relatively short time period.

Figure 6:
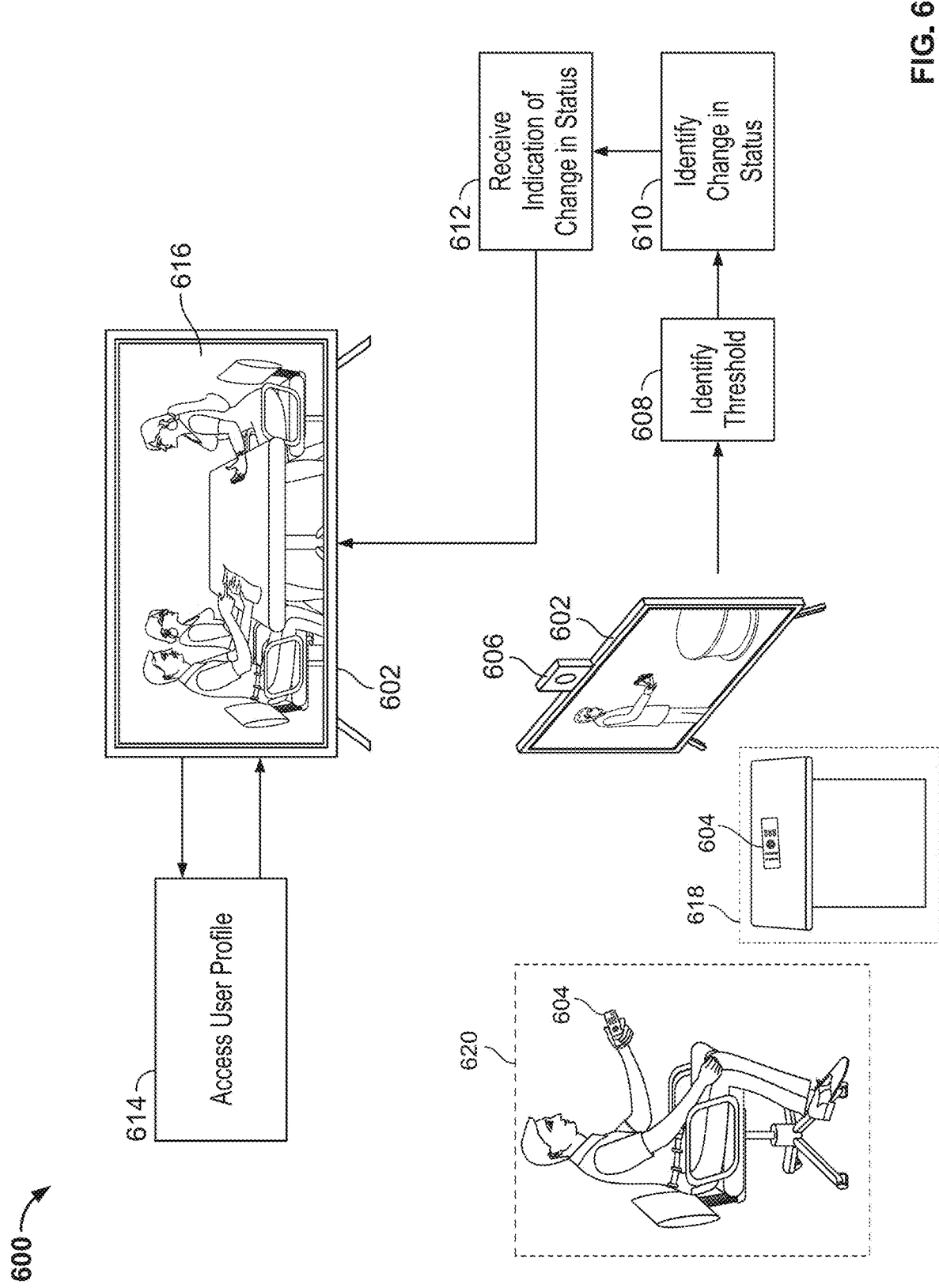
FIG. 6 shows another example environment in which an action is performed in response to a change in status of an input device, in accordance with some embodiments of the disclosure.

FIG. 6 shows another example environment in which an action is performed in response to a change in status of an input device, in accordance with some embodiments of the disclosure. In a similar manner to the environment 200, 500 discussed in connection with FIGS. 2 and 5, the environment 600 comprises a smart television 602, a remote control 604 and a camera 606 in communication with the smart television 602. FIG. 6 depicts a first scenario 618 in which the remote control 504 is in a state of disuse and a second scenario 620 in which the remote control 504 is in a state of use. The smart television 602 generates a content item output that is displayed via a display of the smart television 602. A user interacts with the smart television 602 via remote control 604. In this example, the remote control 604 is a wireless controller that communicates with the smart television 602 via infrared. Movement or orientation of the remote control 604 may be tracked in a manner similar to that described with reference to the controller 106 depicted in FIG. 1. Additionally, one or more thresholds similar or identical to those described with reference to FIG. 1 may be utilized to determine whether or not a change in status of the remote control 604 has occurred.

A threshold is identified 608 based on the status of the controller 604 over a period of time. When the user picks up the controller 604 in the second scenario 620, a change in status, based on the threshold, is identified 610. On identifying the change in status, an indication of the change in status is received 612. On receiving an indication of the change in status, an action to perform is determined and subsequently performed. In this example, the action to be performed comprises accessing a user profile 614 and generating a personalized advertisement 616 for display at the smart television 602. The user profile may pertain to a single user and/or to the household as a whole. The user profile may be stored locally at the smart television 602 or received from a server remote from the smart television 602 via a network, such as the internet. Any of the other actions (e.g., actions 316, 316b, 416a, 416b, 514a, 514b, 514c) described herein may be personalized based on a user profile.

Figure 7:
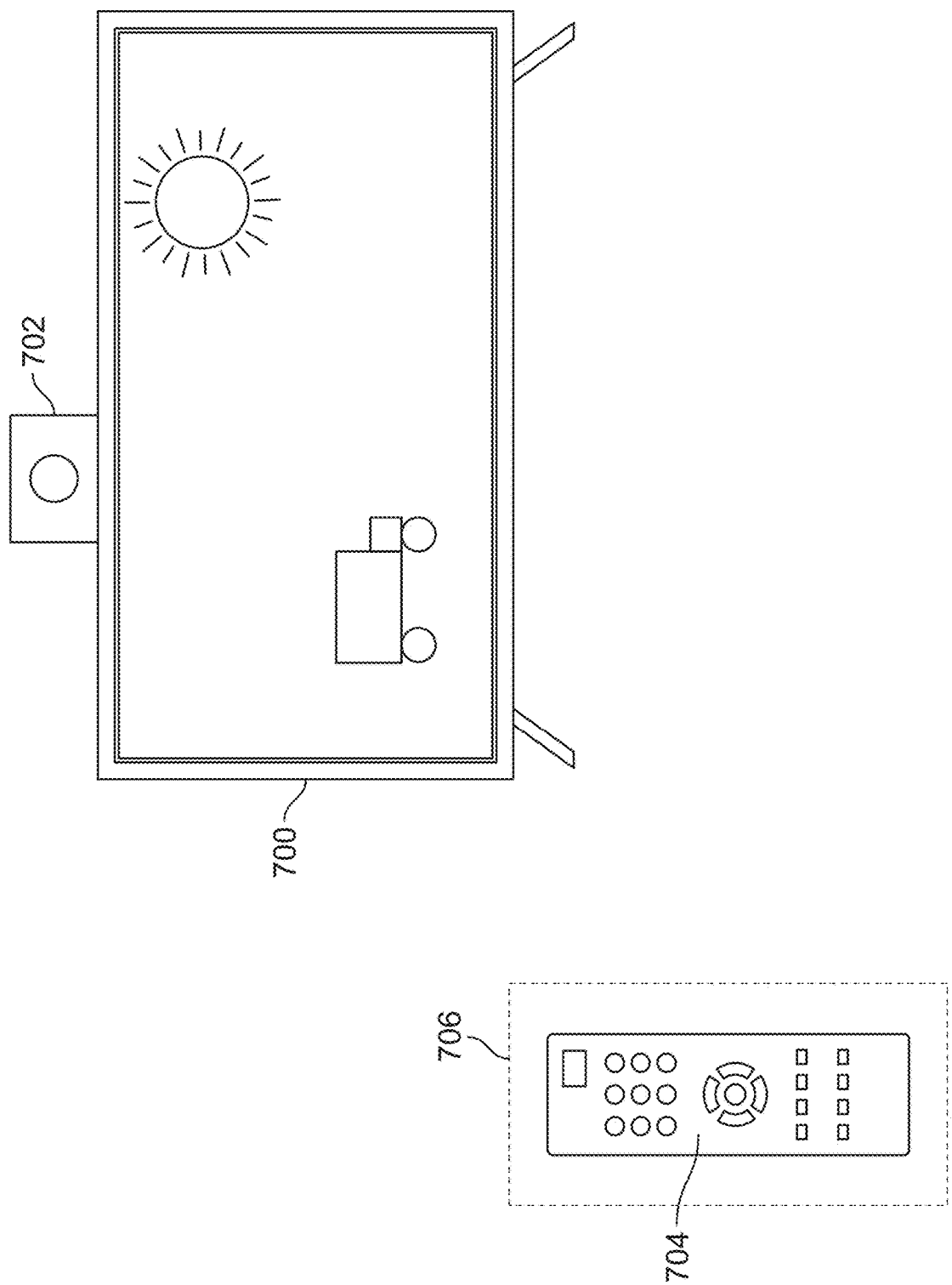
FIG. 7 shows an example environment in which a change in status of an input device is identified, in accordance with some embodiments of the disclosure.

FIG. 7 shows an example environment in which a change in status of an input device is identified, in accordance with some embodiments of the disclosure. The environment comprises smart television 700, camera 702, remote control 704 and virtual border 706. The camera 702 is in communication with smart television 700 and receives a capture comprising remote control 704. A trained machine learning algorithm used machine vision to identify remote control 706. The algorithm also applies virtual boarder 706 to the remote control 704. In determining a threshold, the machine learning algorithm may determine how frequently an edge of the remote control crosses the virtual border 706 over a period of time. For example, if the remote control 704 is placed on a table, the remote control may be entirely static and may not cross the border at all; however, in a second example, if the remote control is placed on a user's lap, the remote control may move around slightly, but still be substantially static. In this second example, an edge of the remote control may cross the border 706 occasionally and/or to a small extent. In this way, a threshold can be identified, based on a status of the input device. In the first example, the threshold may be that no part of the remote control 704 crosses the virtual border. In the second example, a threshold may be based on the frequency and/or the extent to which the remote control 704 crosses the virtual border. When a user picks up the remote control, a much larger portion of the remote control will cross the virtual border 706 and/or no part of the remote control may be within the virtual border 706. As this movement is larger than the identified threshold, a change in status of the remote control is identified.

In a similar manner, a threshold may be identified via an IMU of an input device. In the example, where the input device is a controller for a gaming console, the output of the IMU may indicate that the controller physically moves in three-dimensional space and/or a profile is generated that is associated with user inputs via, for example, buttons of the controller. A threshold may be identified on the output of the IMU over a period of time. In this example, the threshold may be based on how much the controller moves, so a change in status greater than the threshold indicates that the controller is static, or substantially static. When the user puts down the controller, the output of the IMU will be static, or substantially static, which is larger than the identified threshold, and a change in status of the controller is identified.

FIG. 8 shows a block diagram representing components of a computing device and dataflow therebetween for enabling an action to be performed in response to change in status of an input device, in accordance with some embodiments of the disclosure. Computing device 800 (e.g., computing device 102, 202, 302, 402, 502, 602, 700), as discussed above, comprises input circuitry 804, control circuitry 808 and output circuitry 830. Control circuitry 808 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 802 by the input circuitry 804. The input circuitry 802 is configured to received inputs related to a computing device. For example, this may be via an infrared controller, Bluetooth and/or Wi-Fi controller of the computing device 800, a touchscreen, a keyboard, a mouse and/or a microphone. In other examples, this may be via a gesture detected via an augmented, mixed and/or virtual reality device. In another example, the input may comprise instructions received via another computing device. The input circuitry 804 transmits 806 the user input to the control circuitry 808.

The control circuitry 808 comprises a media item generation module 810, a threshold identification module 814, a status identification module 818, a status indication receiving module 822 and an action generation module 826. The control circuitry 808 is in communication with output circuitry 830. The output circuitry 830 comprises action performing module 832. The input is transmitted 806 to the media item generation module 810, where a media item is generated for output. An indication that a media item is being generated for output is transmitted 812 to the threshold identification module 814, where a threshold based on the status of an input device over a period of time is identified. For example, it may be determined that an input device is static, or substantially static, over a period of time, and the threshold may be based on identifying a threshold that indicates that the input device has changed from a substantially static state to a moving state. In another example, the threshold is identified on the converse; it may be determined that an input device is in motion for at least a substantial part of the time period, and the threshold may be based identifying a threshold that indicates that the input device has changed from a moving, or a substantially moving, state to a substantially static state. In another example, the threshold may be associated with a particular inertial movement profile of the input device, for example, an inertial motion profile typically associated with the input device being picked up and/or placed on a surface. The identified threshold is transmitted 816 to the status identification module 818, where a change in status of the input device that is greater than the threshold is identified, for example, that the input device has been picked up and/or put down. On identifying that a change in status of the input device is greater than the threshold, an indication is transmitted 820 to the status indication receiving module 822. In some examples, this may comprise receiving an indication from the input device itself. In other examples, this may comprise one component (for example, a hardware and/or software component) of a computing device receiving an indication from another component of the computing device. The indication is transmitted 824 to the action generation module 826 where an action is generated based on the media item that is being generated for output. An indication of the action is transmitted 828 to the output circuitry 830, where the action is performed by the action performing module 832.

FIG. 9 shows a flowchart of illustrative steps involved in enabling an action to be performed in response to change in status of an input device, in accordance with some embodiments of the disclosure. Process 900 may be implemented on any of the aforementioned computing devices (e.g., computing device 102, 202, 302, 402, 502, 602, 700). In addition, one or more actions of the process 900 may be incorporated into or combined with one or more actions of any other process or embodiments described herein.

At 902, a media item is generated for output, and at 904 it is determined whether the media item is a video game or a content item. If it is determined that the media item is a video game, at 906, a threshold is identified based on the movement of the input device. At 908, it is identified whether a lack of movement of the input device is over the threshold (i.e., the input device has become relatively static). At 910, an indication of the change in status is received and, at 912, an action to perform is identified. At 914, it is determined whether a user profile is available. If a user profile is available, at 916, the user profile is accessed. The process proceeds from step 914, or 916, to 918 where it is identified whether the video game should be paused. If the video game should be paused, the video game is paused at 920. The process proceeds from step 918, or 920, to perform at least one action 922, 924, 926, 928, 930 that was identified at 912. At 922, the action to perform is generating and/or preloading an advertisement for output. The advertisement may be visual only, audio only and/or a combination of the both. At 924, an element is introduced and/or replaced in the video game. For example, a character holding a drink can may have an unbranded drink can replaced with a branded drink can. At 926, a replay is generated. For example, if a multiplayer video game has been paused, a summary of the action missed may be generated for output. At a 928, a characteristic of a character is changed, for example, a character may be made invulnerable in a multiplayer game while the video game is paused. At 930, an update, such as a video game update, may be performed. Any action 922, 924, 926, 928, 930 may be performed in isolation or in combination with any other action 922, 924, 926, 928, 930. In some examples, one or more actions may be repeated.

If it is determined that the media item is a content item, at 932, a threshold is identified based on the input device being static. At 934, it is identified a movement of the input device is over the threshold (i.e., the input device has been picked up). At 936, an indication of the change in status is received and, at 938, an action to perform is identified. At 940, it is determined whether a user profile is available. If a user profile is available, at 942, the user profile is accessed. The process proceeds from step 940, or 942, to perform at least one action 944, 946, 948 that was identified at 938. At 944, the action to perform is generating a summary of a plurality of advertisements. For example, if six advertisements are scheduled to be displayed during a commercial break, then a summary, for example, a static image, of the six advertisements is generated for output. At 946, the action to perform is generating a user interface element for receiving feedback. For example, a status box with the text "Is this commercial relevant to you" may be displayed along with user interface elements for "Yes" and "No." At 948, a shortened advertisement is generated for display. For example, if an original advertisement is 25 seconds long, the advertisement may be replaced with a logo and a jingle for a product that is being advertised. Where a user profile was accessed, an action may be based, at least in part, on the user profile. For example, an advertisement may be customized based on the user profile. Any action 944, 946, 948 may be performed in isolation or in combination with any other action 944, 946, 948. In some examples, one or more actions may be repeated.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating, at a computing device, a media item for output;

providing for display, at a display device associated with the computing device, the media item;

identifying a threshold, wherein the threshold is based on a status of an input device over a period of time, and the input device is associated with the computing device;

identifying, based at least in part on information received from a sensor associated with the input device, a change in status of the input device that is greater than the threshold;

receiving an indication of the change in status of the input device; and performing, in response to receiving the indication, an action based on the media item.

2. The method of claim 1, wherein the media item is a video game and wherein performing the action further comprises pausing the video game and generating an advertisement for output.

3. The method of claim 2, wherein generating an advertisement for output further comprises altering an element of the video game based on the advertisement.

4. The method of claim 1, wherein:

the media item is a video game;

the change in status of the input device is a first change in status; and performing the action further comprises:

identifying a second change in status of the input device; and generating a content item for output based on the video game gameplay between the first change in status and the second change in status.

5. The method of claim 1, wherein:

the media item is a video game;

the change in status of the input device is a first change in status; and performing the action further comprises:

identifying a second change in status of the input device; and changing a status of a character of the video game between the first change in status and the second change in status.

6. The method of claim 1, wherein the sensor is one of an inertial measurement unit (IMU), an IR sensor, a laser sensor, or a received signal strength indicator (RSSI) sensor, and wherein identifying a change in status of the input device further comprises identifying a movement of the input device.

7. The method of claim 1, wherein the sensor is one of an inertial measurement unit (IMU), an IR sensor, a laser sensor, or a received signal strength indicator (RSSI) sensor, and wherein identifying a change in status of the input device further comprises identifying an absence of movement of the input device over a threshold period of time.

8. The method of claim 1, wherein performing the action further comprises:
   generating a summary of a plurality of advertisements; and
   generating the summary of the plurality of advertisements for output.

9. The method of claim 1, wherein performing the action further comprises:
   identifying that an advertisement is being generated for output; and
   generating a user interface element for output, the user interface element configured to enable input on the advertisement to be received.

10. The method of claim 1, wherein:
    a user profile is associated with the computing device; and
    performing the action further comprises generating an advertisement for output based on the user profile.

11. The method of claim 1, further comprising identifying, based on the change in status, a time period for performing the action.

12. A system comprising:
    a communication port;
    a memory storing instructions; and
    control circuitry communicably coupled to the memory and the communication port and configured to execute instructions to:
       generate, at a computing device, a media item for output;
       cause display, at a display device associated with the computing device, the media item'
       identify a threshold, wherein the threshold is based on a status of an input device over a period of time, and the input device is associated with the computing device;
       identify, based at least in part on information received from a sensor associated with the input device, a change in status of the input device that is greater than the threshold;
       receive an indication of the change in status of the input device; and
       perform, in response to receiving the indication, an action based on the media item.

13. The system of claim 12, wherein the media item is a video game and wherein the control circuitry configured to perform the action is further configured to pause the video game and generate an advertisement for output.

14. The system of claim 13, wherein the control circuitry configured to generate an advertisement for output is further configured to alter an element of the video game based on the advertisement.

15. The system of claim 12, wherein:
    the media item is a video game;
    the change in status of the input device is a first change in status; and
    the control circuitry configured to perform the action is further configured to:
       identify a second change in status of the input device; and
       generate a content item for output based on the video game gameplay between the first change in status and the second change in status.

16. The system of claim 12, wherein:
    the media item is a video game;
    the change in status of the input device is a first change in status; and
    the control circuitry configured to perform the action further is further configured to:
       identify a second change in status of the input device; and
       change a status of a character of the video game between the first change in status and the second change in status.

17. The system of claim 12, wherein the sensor is one of an inertial measurement unit (IMU), an IR sensor, a laser sensor, or a received signal strength indicator (RSSI) sensor, and wherein the control circuitry configured to identify a change in status of the input device is further configured to identify a movement of the input device.

18. The system of claim 12, wherein the sensor is one of an inertial measurement unit (IMU), an IR sensor, a laser sensor, or a received signal strength indicator (RSSI) sensor, and wherein the control circuitry configured to identify a change in status of the input device is further configured to identify an absence of movement of the input device over a threshold period of time.

19. The system of claim 12, wherein the control circuitry configured to perform the action is further configured to:
    generate a summary of a plurality of advertisements; and
    generate the summary of the plurality of advertisements for output.

20. The system of claim 12, wherein the control circuitry configured to perform the action is further configured to:
    identify that an advertisement is being generated for output; and
    generate a user interface element for output, the user interface element configured to enable input on the advertisement to be received.

* * * * *